United States Patent Office 3,427,992
Patented Feb. 18, 1969

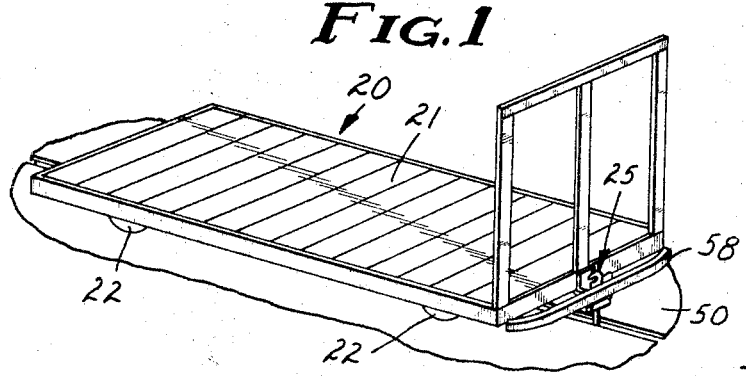
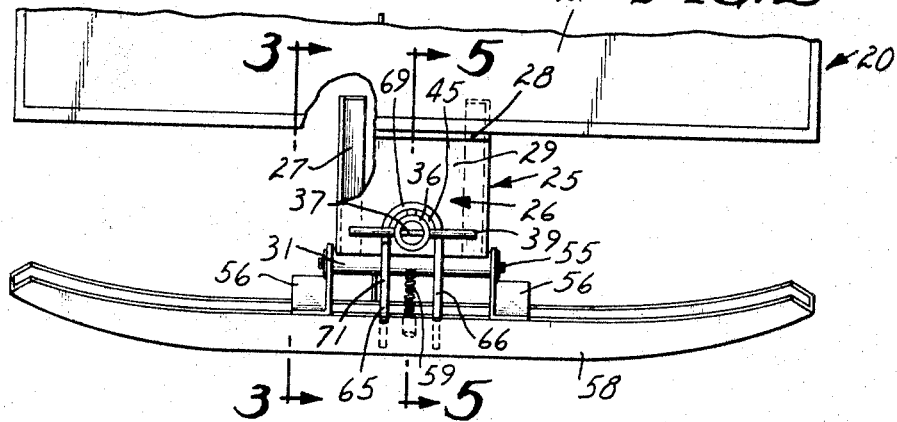
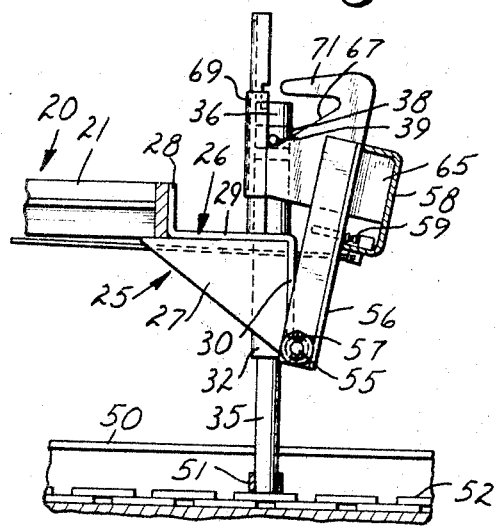
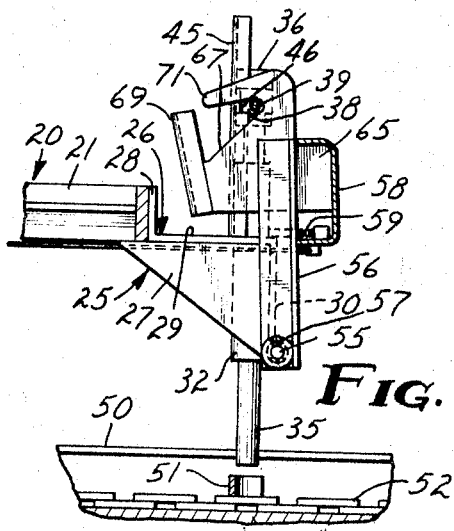

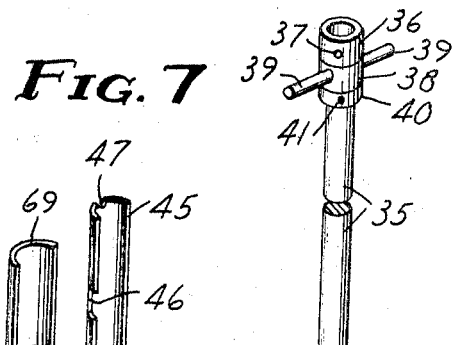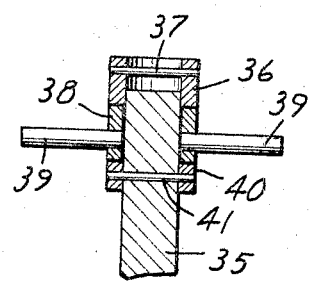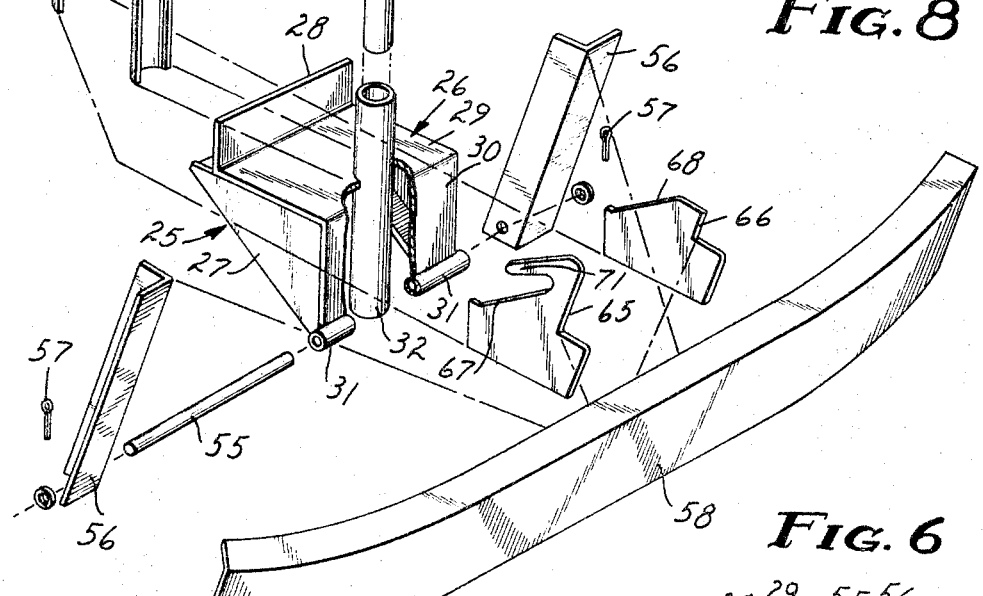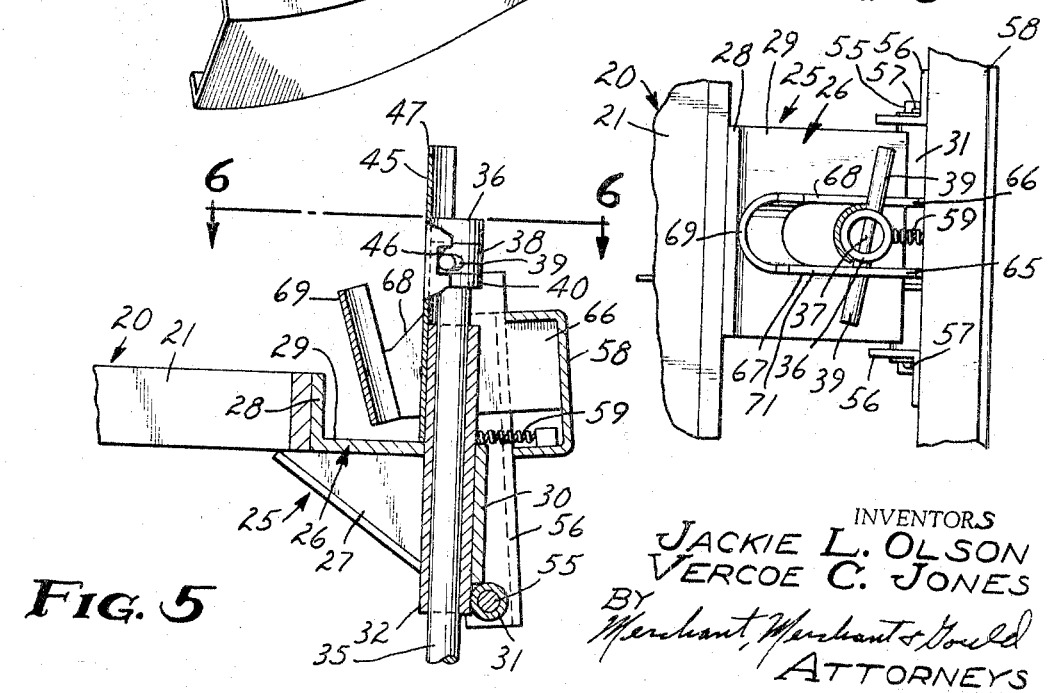

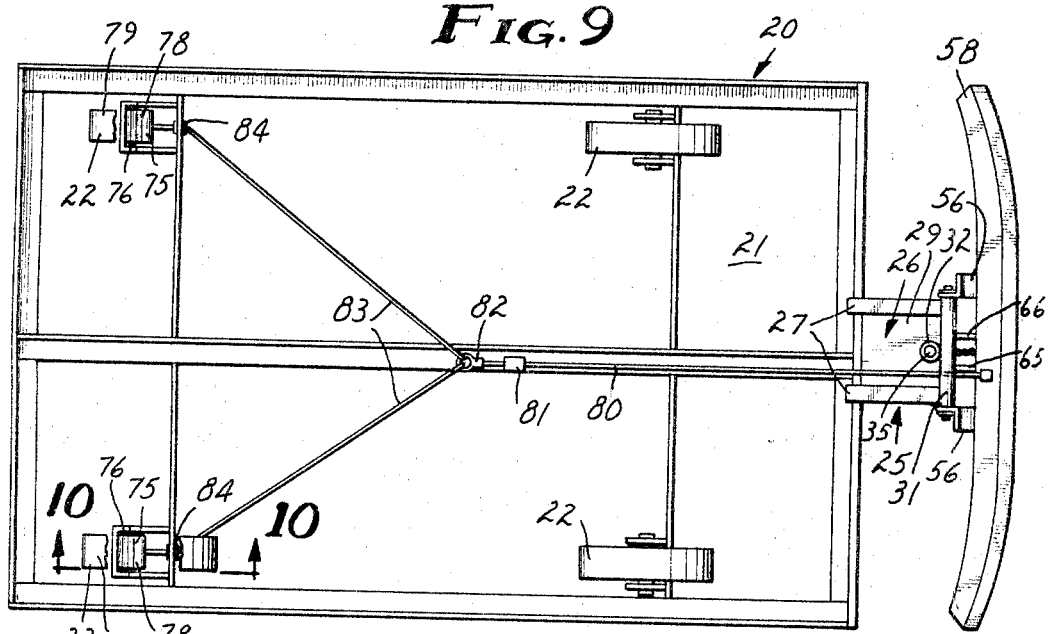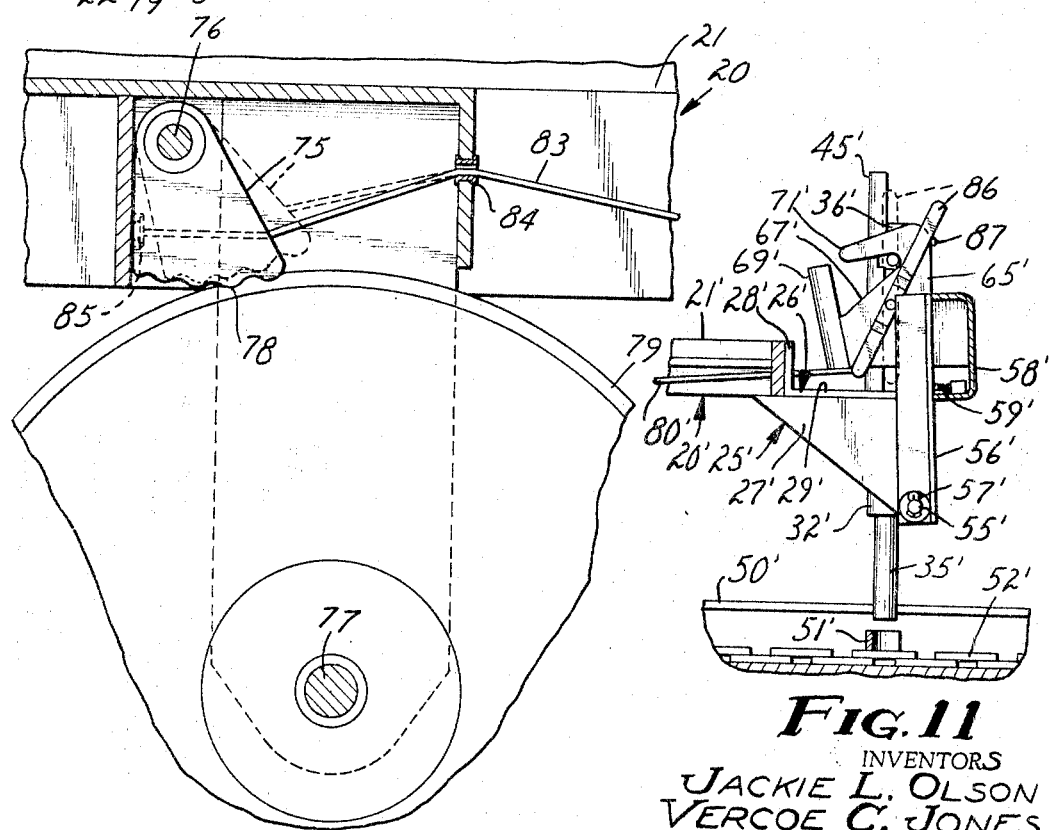

3,427,992
CONTROL APPARATUS
Vercoe C. Jones and Jackie L. Olson, Faribault, Minn., assignors to Nutting Truck and Caster Company, Faribault, Minn., a corporation of Minnesota
Filed Dec. 6, 1965, Ser. No. 511,727
U.S. Cl. 104—172      14 Claims
Int. Cl. B61b *13/00, 9/00, 7/20*

ABSTRACT OF THE DISCLOSURE

Apparatus for automatically disengaging a tow pin from a drag line when the bumper of a truck having the tow pin mounted thereon strikes an obstruction. The apparatus includes a member fixedly attached to the bumper for rearward pivotal movement therewith having a ramp with stops at either end and a horizontal pin attached to the tow pin and slidably engaged with said ramp. As the bumper is moved rearwardly by an obstruction, the horizontal pin slides up the ramp and, upon hitting the stop at the upper end, is engaged in a slot to hold the tow pin out of contact with the drag line. As the bumper is allowed to move forward, the stop at the other end of the ramp engages the pin and releases it from the slot to allow the tow pin to engage with the drag line.

---

This invention pertains to apparatus for deactivating the tow pin of a materials handling truck and more specifically to apparatus which disengages the tow pin of the truck from the drag line when the bumper strikes an obstruction and maintains the tow pin disengaged until the obstruction is removed.

Many disconnect devices have been constructed for materials handling trucks of the type that use a tow pin, which is adapted to engage an endless chain, as the motivating force. In all of these devices a movable bumper is attached to the front of the truck which bumper has means attached thereto for moving the tow pin vertically upward out of engagement with the chain when the bumper strikes an object. When the object is removed the bumper gradually returns to its normal position and the tow pin gradually returns into engagement with the chain. This gradual return of the tow pin into engagement with the chain causes much wear on the end of the tow pin and on the chain. In addition, it is sometimes desirable to provide for a substantial amount of bumper movement without danger of the tow pin engaging or partially engaging the endless chain. This is especially true where it is desirable to accumulate a group of trucks for movement onto a spare track or the like.

In the present invention the tow pin is mounted for vertical movement and has latching means or a smaller horizontal rod attached thereto. The bumper is pivotally mounted at the front of the truck and has a ramp fixedly attached thereto which engages the horizontal rod on the tow pin and moves the tow pin vertically upward out of engagement with the chain as the bumper is moved rearwardly. A stop at the upper end of the ramp moves the horizontal rod into a slot in the tow pin mounting means, which maintains the tow pin disengaged from the chain when the obstacle is removed and the bumper moves forward. When the bumper reaches its normal position a stop at the lower end of the ramp moves the horizontal rod out of the slot and the tow pin moves under the force of gravity into its operative position. Also, when the bumper strikes an object, such as another truck or the like, and moves rearwardly to disengage the tow pin from the chain, frictional brakes engage the rear wheels to prevent the truck from moving rearwardly under the force of the impact. Thus, since the tow pin is not returned to its operative position until the bumper moves forward a sufficient distance to disengage the horizontal rod from the slot, slight roll back of the truck or movement of the obstruction due to the impact will not cause the tow pin to be re-engaged with the chain and, thereby, possibly cause a plurality of impacts.

It is an object of the present invention to provide a new and improved tow pin deactivating apparatus.

It is a further object of the present invention to provide apparatus for lifting a tow pin out of engagement with a motivating chain when the truck strikes an obstacle and to maintain the tow pin disengaged until the obstacle is removed.

It is a further object of the present invention to provide a tow pin deactivating apparatus which allows the tow pin to move from the disengaged to the engaged position in a single step, thereby, greatly reducing wear on the apparatus and partial or premature engagement of the tow pin with a motivating chain.

These and other objects of this invention will become apparent to those skilled in the art upon consideration of the accompanying specification, claims and drawings.

Referring to the drawings, wherein like characters indicate like parts throughout the figures:

FIG. 1 is a view in perspective of a materials handling truck having the present apparatus mounted thereon;

FIG. 2 is an enlarged top view, parts thereof broken away;

FIG. 3 is a sectional view as seen from the line 3—3 in FIG. 2;

FIG. 4 is a view similar to FIG. 3 with the apparatus in a different position;

FIG. 5 is a sectional view as seen from the line 5—5 in FIG. 2;

FIG. 6 is a sectional view as seen from the line 6—6 in FIG. 5;

FIG. 7 is an enlarged exploded view in perspective of the deactivating apparatus;

FIG. 8 is an enlarged sectional view illustrating the details of the latch means at the upper end of the tow pin;

FIG. 9 is an enlarged bottom view of the materials handling truck, parts thereof broken away;

FIG. 10 is a sectional view as seen from the line 10—10 in FIG. 9; and

FIG. 11 is a view similar to FIG. 4 of a somewhat different embodiment.

In the figures the numeral 20 generally designates a materials handling truck having a bed 21 with four wheels 22 rotatably mounted to the underside thereof in the usual manner. The bumper, tow pin and deactivating mechanism are illustrated in FIGS. 2–8.

Mounting means or a base generally designated 25 includes a flat plate 26 bent so as to have a Z-shaped cross-section with a pair of gussets 27 mounted along either edge. A first arm 28 of the Z-shaped plate 26 is fixedly attached approximately centrally in the front of the bed 21 so that it is substantially vertical. A central flat portion 29 of the Z-shaped plate 26 extends outwardly in front of the bed 21 from the arm 28 approximately horizontally. A second arm 30 of the Z-shaped plate 26 extends downwardly approximately vertically from the end of the central portion 29. The angles between arm 28-central portion 29 and central portion 29-arm 30 are approximately 90° and the gussets 27 are fixedly attached between the central portion 29 and the arm 30 by some means such as welding or the like. The gussets 27 extend rearwardly past the front of the bed 21 slightly to add extra support to the mounting means 25. The mounting means 25 has a hollow cylindrical member 31 fixedly attached to the front surface at the lower end of the arm 30 in an approximately horizontal position transverse to the longitudinal axis of the truck 20. A second hollow cylindrical member 32 is vertically mounted in an opening in the flat portion 29 of the bracket 26 so that it lies parallel and in juxtaposition to the arm 30 and it extends from the lower end thereof upwardly a substantial distance past the flat portion 29. The cylindrical member 32 is fixedly attached to the arm 30 and the flat portion 29 by some means such as welding or the like.

A solid cylindrical tow pin 35 is slideably mounted in the cylindrical member 32 for relative vertical movement. The tow pin 35 has a hollow cylindrical collar 36 concentrically attached to the extreme upper end thereof by some means such as welding or the like. The collar 36 extends slightly past the upper end of the tow pin 35 and has a pin 37 extending diametrically therethrough. The pin 37 is provided for the attachment of a chain or the like to manually move the tow pin 35 to a disengaged position, as will be explained in more detail later. A hollow cylindrical member 38 having an inner diameter slightly larger than the outer diameter of the tow pin 35 is concentrically fitted over the tow pin 35 in abutting relationship with the collar 36. Latch means 39, which consists of a pair of pins extending radially outwardly from either side of the cylindrical member 38, are rotatable with respect to the tow pin 35. A second collar 40 is fixedly attached to the tow pin 35 immediately below the cylindrical member 38 to substantially prevent longitudinal movement of the cylindrical member 38 along the tow pin 35 while allowing relative rotation therebetween. The collar 40 is attached to the tow pin 35 by some means such as pin 41 extending therethrough, welding, etc.

A retaining means 45 is approximately one-half of a hollow cylinder the inner diameter of which is slightly larger than the outer diameter of the cylindrical member 32. The retaining means 45 is mounted so that it is concentric with the cylindrical member 32 and overlies the rear portion thereof. In addition, the retaining means 45 extends upwardly a substantial distance above the cylindrical member 32. A slot 46 is cut in one edge of the retaining means 45 approximately midway between the lower and upper ends thereof. Also, a notch 47 is cut in the upper end of the retaining means 45. The outer diameter of the collars 36 and 40 and the cylindrical member 38 at the upper end of the tow pin 35 are approximately equal to the outer diameter of the cylindrical member 32. Thus, when the tow pin 35 is slideably engaged in the cylindrical member 32 the collars 36 and 40 at the upper end thereof fit concentrically within the retaining means 45 and the latch means 39 is maintained transverse to the longitudinal axis of the truck 20. The relationship of the various members is such that the tow pin 35 extends downwardly a sufficient distance to pass through a slot in a floor 50 and engages a dog 51 in an endless chain 52 when the collar 40 rests on the upper end of the cylindrical member 32. When the latch means 39 is engaged in the slot 46 of the retaining means 45 the tow pin 35 is raised a sufficient distance to be disengaged from the dog 51 but it still extends through the slot in the floor 50 and the movements of the truck 20 are guided by the slot in the floor 50. When the tow pin 35 is raised a sufficient distance for the latch 30 to be engaged in the notch 47 of the retaining means 45 the lower end of the tow pin 35 is above the floor 50 and the truck 20 is free to move in any direction.

A solid elongated rod 55 having an outer diameter slightly smaller than the inner diameter of the cylindrical member 31 is placed therein so that the ends extend a short distance outwardly from each end of the cylindrical member 31. A pair of angle irons 56 have a hole drilled in an arm thereof adjacent one end to receive the rod 55 therethrough. The angle irons 56 are rotatably mounted by cotter pins 57 or the like on the ends of the rod 55 so that they extend upwardly and present a flat face to a bumper 58. The bumper 58 is constructed similar to a piece of channel iron and extends across the front of the bed 21 with the ends slanted silghtly rearwardly. The bumper 58 is affixed to the upper ends of the angle irons 56 by some means such as welding or the like. In the present embodiment the rod 55 is mounted so that the bumper 58 can pivot rearwardly slightly past center and, therefore, will not return to a forward position under the force of gravity but must be biased forwardly by a compression coil spring 59 which is fixedly attached to the inner surface of the bumper 58. When the bumper 58 is rotated rearwardly one end of the spring 59 strikes the cylindrical member 32 and provides a bias on the bumper 58 tending to move it in a forward direction. Once the bumper 58 passes the vertical position gravity tends to move it forward. Variations in the location of rod 55 may cause the bumper to move to the forward position solely under the force of gravity and, therefore, spring 59 would not be required.

A pair of irregular shaped members 65 and 66 are fixedly attached to the inner surface of the bumper 58 in a spaced apart parallel relationship and extend rearwardly therefrom. The distance between the members 65 and 66 is slightly larger than the diameter of the retaining means 45 and the members 65 and 66 are mounted approximately vertically so that they pass on either side of the retaining means 45 as the bumper 58 is pivoted rearwardly. The lower portion of each of the members 65 and 66 is substantially similar, each having a portion 67 and 68 respectively which slopes rearwardly and downwardly to the rear edge thereof. The portions 67 and 68 cooperate to form a ramp for the latch means 39.

A member 69, which is approximately one-half of a hollow cylinder having a diameter slightly larger than the diameter of the retaining means 45, is fixedly attached to the rear edge of the members 65 and 66 and extends upwardly a distance somewhat greater than the uppermost extremity of the portions 67 and 68 forming the ramp for the latch means 39. The member 69 limits the forward movement of the bumper 58. When the bumper 58 is in a first or normal position the member 69 is substantially concentric with the retaining means 45 and the entire mechanism is maintained in this position by the weight of the bumper 58, or gravity. In the normal position of the bumper 58 the latch means 39 lies on the rearmost lower extremity of the ramp formed by portions 67 and 68. In this position the collar 40 of the tow pin 35 rests on the upper end of the cylindrical member 32 and the tow pin extends through the floor 50 a sufficient distance to engage a dog 51. Thus, the tow pin 35 is in operative position and, assuming the endless chain 52 is operating, will power the truck 20 along the slot in the floor 50.

When the bumper 58 strikes an object, such as an immobile truck in its path, the bumper 58 is driven rearwardly, which in turn moves the members 65, 66 and 69 rearwardly. As the members 65 and 66 move rearwardly the latch means 39 slides upwardly on the ramp formed by the portions 67 and 68. The upward movement of the latch means 39 carries the tow pin 35 upwardly until it clears the dog 51 but still extends into the slot in the floor 50. The upper end of the portion 67 on the member 65 has a hook 71 formed thereon which extends upwardly and rearwardly in the same plane as the portion 67 but spaced therefrom a substantial distance. As the bumper 58 is moved rearwardly by an obstruction in the path of the truck 20 one end of the latch means 39 eventually strikes the hook portion 71 of the member 65 which rotates the latch means 39 slightly with respect to the tow pin 35 and slides it into the slot 46 in the retaining means 45. At this point the bumper 58 has moved rearwardly to what is defined as the second position, or its rearmost position. As the obstruction and the truck 20 separate, the spring 59 forces the bumper 58 forward until the weight of the bumper pulls it against the obstruction or into the first position, whichever is reached first. Assuming the obstruction has been removed completely the bumper 58 will return to the first position and the member 69 will be moved into a position concentric with the retaining means 45. At this time the member 69 will slide the latch means 39 out of the slot 46 and the tow pin 35 will drop into its normal or operating position in engagement with a dog 51.

When the tow pin 35 is slid out of engagement with a dog 51 by the latch means 39 sliding up the ramp formed by the portions 67 and 68 the forward force of the dog 51 may suddenly be transposed into a vertical upwardly directed force. This is especially true when the upper edge of the dog 51 and the lower edges of the tow pin 35 become rounded from wear. Because of this sudden change in the direction of the force produced by dog 51 the tow pin 35 may actually be thrown out of the cylindrical member 32. The hooked portion 71 of the member 65 is provided to prevent this phenomenon from occurring. The hooked portion 71 is spaced from the portion 67 of the member 65 a sufficient distance so that it will not pull the latch means 39 from the slot 46 as the bumper 58 is returning toward the first position but will prevent the tow pin 35 from moving vertically out of the slot in the floor 50. It should be noted that the tow pin 35 is rotatable with respect to the latch means 39 and the cylindrical member 32 so that the tow pin 35 will not wear excessively on any particular side due to sliding engagement with the slots in the floor 50.

Brake means, which consist of a pair of pendulously mounted blocks 75 and connecting means 76 which attach the blocks 75 to the bumper 58 are utilized to prevent rearward movement of the truck 20 after impact with an obstacle. The blocks 75 are somewhat oblong or wedge shaped having a hole at the apex thereof for the insertion of a shaft 76. The shaft 76 is fixedly mounted on the underside of the bed 21 with its longitudinal axis substantially parallel to the rotational axis 77 of the wheel 22 with which it is associated. The blocks 75 are somewhat wedge-shaped and are depended from the apex of the wedge whereby a substantial surface 78 is presented to the edge of each rear wheel 22. In addition, the rearmost surface of the blocks 75 is substantially shorter than the foremost surface so that the surface 78 lies at an angle to the outer periphery of the wheel 22. The distance between the shaft 76 and the rotational axis 77 of the wheel 22 is somewhat greater than the radius of the wheel 22 plus the length of the rear surface of the block 75 but substantially less than the radius of the wheel 22 plus the length of the foremost surface of the block 75. Thus, as the wheel 22 rotates in a forward direction the block 75 is moved in a counterclockwise direction (referring to FIG. 10) but when the wheel 22 moves in the reverse direction the block 75 frictionally engages the outer periphery thereof and tends to move in a clockwise direction. This movement of the block 75 in a clockwise direction wedges the block tightly against the outer periphery of the wheel 22 effectively stopping movement thereof. To aid the frictional engagement of the blocks 75 with the outer periphery of the wheels 22, the blocks 75 are constructed of cast iron or the like and the lower surface 78 has a plurality of ridges, or other roughening features, therein. Also, in the present embodiment the wheels 22 have a hard rubber tire 79 thereon. However, it should be understood that the brake means disclosed would operate if the blocks 75 were constructed of other material and the rubber tires 79 were not on the wheels 22.

To connect the blocks 75 to the bumper 58 for proper operation therewith a rod 80 is connected from the underside of the bumper 58 and extends rearwardly to approximately the center of the truck 20. It should be understood that rod 80 may be connected to numerous places on the moving parts of the bumper assembly. A small block 81 having a hole therethrough acts as a guide for the movement of the rod 80 with the bumper 58 in a longitudinal direction along the undersurface of the truck 20. The rearmost end of the rod 80 has a ring 82 thereon to which are connected a pair of cables 53. Each of the cables 83 extend outwardly and rearwardly through a grommet 84 in a portion of the bed 21 in front of the two blocks 75 above the two rear wheels 22. Each of the cables 83 is threaded through a hole in one of the blocks 75 substantially parallel to the lower edge 78 and spaced slightly therefrom. Each of the cables 83 has some means 85 at the end thereof to prevent the cable 83 from being pulled through the hole in the block 75. The length of the rod 80 and the cables 83 is such that the blocks 75 are in a first position, not in engagement with the surface of the wheels 22, when the bumper 58 is in its first or normal position. However, when the bumper 58 strikes an obstruction and moves rearwardly the rod 80 and cables 83 move rearwardly allowing the blocks 75 to swing downwardly and engage the outer periphery of the wheels 22, thereby, wedging them tightly against the wheels 22 and preventing rearward movement thereof. As can be seen from FIGS. 9 and 10, when bumper 58 moves rearwardly blocks 75 move into a second range of positions in which the blocks 75 frictionally engage the outer periphery of the wheels 22 and pivot into wedging engagement with the outer periphery of the wheels 22 upon the reverse rotation thereof. The wedging action of the blocks 75 against the outer periphery of the wheels 22 increases as the speed and/or momentum of the truck 20 increases so that the engagement of the blocks 75 with the wheels 22 occurs over a second range of positions with the exact position depending upon a variety of factors.

Referring to FIG. 11 an alternate embodiment is illustrated wherein parts similar to the previous embodiment are designated with a similar number having a prime added. In the event that the truck stops against an object which cannot be moved forward, and it is desirable to move the truck, a means of releasing the blocks 75' is desirable. A means of accomplishing this is provided in the alternate arrangement in FIG. 11 by attaching the front end of rod 80' to the lower end of a movable arm 86. Arm 86 is pivotally attached at its midsection to the member 65' and moves toward the body of the truck when the bumper 58' strikes an object. The top of the arm 86 is restrained from forward motion in its normal position by a stop 87 fixedly attached to the member 65' but can be manually pushed rearward toward the body of the truck by an attendant. Such a pivoting motion of the arm 86 will pull rod 80' forward, thus releasing the blocks 75' without requiring the bumper 58' to return to its normal forward position as would result in the normal removal of the interference.

Thus, apparatus has been described which deactivates the tow pin 35 when the bumper 58 strikes an obstruction in its path. The apparatus lifts the tow pin out of engagement with a dog 51 so that motivating power is removed from the truck 20 but the tow pin 35 remains in the slot in the floor 50 so that the truck 20 may be automatically reconnected to a dog 51 when the obstruction is removed. The tow pin 35 is retained in a deactivated position until the obstruction is removed so that the bumper 58 may return to its normal position. When the bumper 58 returns to its normal position the tow pin 35 drops immediately into the operating position whereby damage to the apparatus is greatly reduced.

While we have shown and described a specific embodiment of this invention, further modifications and improvements will occur to those skilled in the art. We desire it to be understood, therefore, that this invention is not limited to the particular forms shown and we intend in the appended claims to cover all modifications which do not depart from the spirit and scope of this invention.

What is claimed is:
1. Tow pin deactivating apparatus for a materials handling truck comprising:
   (a) a tow pin adapted to connect said truck to a drag line in an operative position, said tow pin having latch means attached thereto;
   (b) means mounting said tow pin on said truck for vertical movement relative to said truck between the operative position and an inoperative position;
   (c) retaining means positioned adjacent said tow pin and adapted to engage said latch means to retain said tow pin in an inoperative position;
   (d) an obstruction engaging bumper pivotally mounted at the front of said truck for movement between a first and second position and biased to said first position; and
   (e) mechanism fixedly attached to said bumper for moving said tow pin from the operative position to the inoperative position as said bumper moves from said first to said second position and for moving said latch means into engagement with said retaining means, said mechanism including release means for automatically disengaging said latch means from said retaining means as said bumper approaches said first position, whereby said tow pin automatically returns to the operative position.

2. Tow pin deactivating apparatus for a materials handling truck substantially as set forth in claim 1 having in addition brake means operative to substantially prevent said truck from moving in a reverse direction when said bumper is in said second position and allow free movement when said bumper is in said first position.

3. Tow pin deactivating apparatus for a materials handling truck including brake means substantially as set forth in claim 2 wherein said brake means includes at least one pivotally mounted block biased into frictional engagement with a wheel on said truck and means attached between said block and the bumper for retaining said block in a disengaged position when said bumper is in the first position.

4. Tow pin deactivating apparatus for a materials handling truck substantially as set forth in claim 1 having in addition means attached thereto for limiting the amount of upward vertical movement of the tow pin during operation of the mechanism attached to the bumper to prevent the tow pin from being removed completely from the floor.

5. Tow pin deactivating apparatus for a materials handling truck substantially as set forth in claim 1 wherein the retaining means includes a member having a slot therein elevated somewhat above the normal position of the latch means, the mechanism fivedly attached to said bumper includes a ramp for slideably engaging the latch means to move said tow pin vertically to the inoperative position as said bumper moves from the first to the second position, said ramp having stops at either end which slide the latch means respectively into and out of said slot.

6. Tow pin deactivating apparatus for a materials handling truck substantially as set forth in claim 2 having in addition manually operable means for releasing the brake means without returning the bumper to the first position.

7. Tow pin deactivating apparatus for a materials handling truck substantially as set forth in claim 1 having in addition, wheels for supporting said truck and brake means wherein the brake means includes:
   (a) at least one generally wedge-shaped brake block;
   (b) means pivotally mounting said brake block adjacent one of said wheels;
   (c) said brake block being disposed to allow free rotation of said one wheel when said brake block is in a first position and disposed so that a braking surface thereof frictionally engages the outer periphery of said one wheel in a second range of positions;
   (d) said braking surface being so shaped that the radial distance between the pivot point and the point of engagement of said surface with said wheel increases as said brake block pivotally moves in said second range of positions in a direction corresponding to the reverse rotation of said wheel from its normal forward direction;
   (e) said brake block being further disposed so that in said second range of positions the frictional engagement of said braking surface with said one wheel is effective to wedge said brake block against said one wheel upon the reversal of rotation of said one wheel from its normal forward direction by reason of said increasing radial distance between the pivot point and the point of engagement of said braking surface with said wheel, and
   (f) means connecting said brake block to said bumper in such a manner that said brake block is maintained in said first position when said bumper is in said first position and said brake block pivotally moves into said second range of positions when said bumper is moved to said second position.

8. Control apparatus for a materials handling truck supported by wheels comprising:
   (a) a tow pin adapted to connect said truck to a drag line in an operative position;
   (b) means mounting said tow pin on said truck for vertical movement relative to said truck between the operative position and an inoperative position;
   (c) an obstruction engaging bumper pivotally mounted at the front of said truck for movement between a first and second position and biased to said first position;
   (d) mechanism fixedly attached to said bumper for moving said tow pin from the operative position to the inoperative position as said bumper moves from said first to said second position;
   (e) at least one generally wedge shaped brake block;
   (f) means pivotally mounting said brake block generally adjacent one of said wheels;
   (g) said brake block being disposed to allow free rotation of said one wheel when said brake block is in a first position and disposed so that a braking surface thereof frictionally engages a portion of said one wheel in a second range of positions;
   (h) said braking surface being so shaped that the radial distance between the pivot point and the point of engagement of said surface with said wheel increases as said brake block pivotally moves in said second range of positions in a direction corresponding to the reverse rotation of said one wheel from its normal forward direction;
   (i) said brake block being further disposed so that in the second range of positions the frictional engagement of said braking surface with said one wheel is effective to wedge said brake block against said one wheel upon the reversal of rotation of said one wheel from its normal forward direction by reason of said increasing radial distance between the pivot point and the point of engagement of said braking surface with said wheel; and
   (j) means connecting said brake block to said bumper in such a manner that said brake block is maintained in said first position when said bumper is in said first position and said brake block pivotally moves into said second range of positions when said bumper is moved to said second position.

9. Control apparatus for a materials handling truck supported by wheels as set forth in claim 8 wherein the brake block is pendulously mounted above one of the wheels and pendulously moved into said second range of positions when said bumper is moved to said second position.

10. Control apparatus for a materials handling truck supported by wheels as set forth in claim 9 wherein the braking surface of the brake block has irregularities thereon to increase the friction.

11. Tow pin deactivating apparatus for a materials handling truck as set forth in claim 1 wherein said mechanism fixedly attached to said bumper includes a ramp for slideably engaging the latch means to move said tow pin vertically to the inoperative position as said bumper moves from the first to the second position, said ramp having stops at either end which move the latch means respectively into and out of engagement with said retaining means.

12. Tow pin deactivating apparatus for a materials handling truck as set forth in claim 1 wherein said latch means includes a crosspin and in which said mechanism attached to said bumper rotates said crosspin to a position where the crosspin is retained by said retaining means as said bumper approaches said second position.

13. Tow pin deactivating apparatus for a materials handling truck as set forth in claim 12 wherein said mechanism fixedly attached to said bumper includes a ramp for slideably engaging said crosspin to move said tow pin vertically to the inoperative position as said bumper moves from the first to the second position, said ramp having stops at either end which rotate said crosspin respectively into and out of engagement with said retaining means.

14. Tow pin deactivating means for a materials handling truck as set forth in claim 13 wherein said retaining means includes a member having a slot formed therein elevated somewhat above said crosspin when said tow pin is in the operative position and wherein the stop at one end of said ramp rotates said crosspin into said slot and the stop at the other end of said ramp rotates said crosspin out of said slot.

References Cited

UNITED STATES PATENTS 2,619,370   11/1952   Leger _____ 104—172 X
3,103,895   9/1963   Bradt et al. _____ 104—172
3,295,462   1/1967   Bradt _____ 104—172

ARTHUR L. LA POINT, *Primary Examiner.*

D. F. WORTH, *Assistant Examiner.*

U.S. Cl. X.R.

104—178